United States Patent [19]

Tanaka et al.

[11] Patent Number: 5,130,838
[45] Date of Patent: Jul. 14, 1992

[54] LASER PROJECTION TYPE DISPLAY UNIT

[75] Inventors: Satoru Tanaka; Yasushi Murata; Fumio Matsui, all of Saitama; Masaki Saito, Kawagoe, all of Japan

[73] Assignee: Pioneer Electronic Corporation, Tokyo, Japan

[21] Appl. No.: 630,015

[22] Filed: Dec. 19, 1990

[30] Foreign Application Priority Data

Jun. 18, 1990 [JP] Japan .................................. 2-159084

[51] Int. Cl.⁵ .......................................... G02B 26/08
[52] U.S. Cl. ................................... 359/200; 359/202; 359/216; 359/305
[58] Field of Search ............... 350/355, 356, 358, 486, 350/371; 353/37, 99, 5, 11, 88; 358/63, 208; 359/212, 221, 198, 200, 202, 204, 216, 305

[56] References Cited

U.S. PATENT DOCUMENTS

| 4,213,146 | 7/1980 | Maiman | 350/486 |
| 4,329,012 | 5/1982 | Minoura et al. | 359/202 |
| 4,611,245 | 9/1986 | Trias | 350/371 |

Primary Examiner—Eugene R. LaRoche
Assistant Examiner—Evelyn A. Lester
Attorney, Agent, or Firm—Perman & Green

[57] ABSTRACT

A laser projection type display unit. A light modulator is provided between a laser light source and a galvanometer scanner. By cutting off the laser beam or modulating the amplitude of the laser beam by means of the light modulator, independent point groups can be displayed.

8 Claims, 5 Drawing Sheets

Fig. 3A 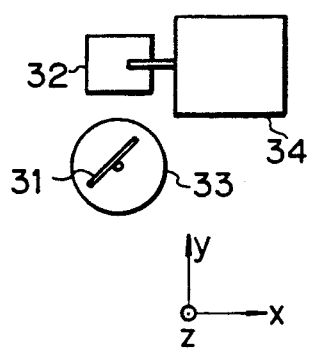 Fig. 3B 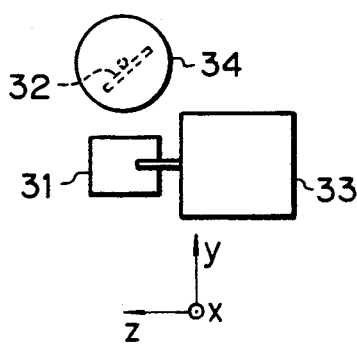 Fig. 3C 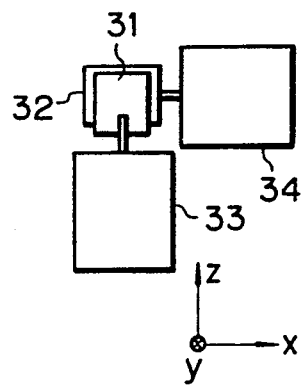

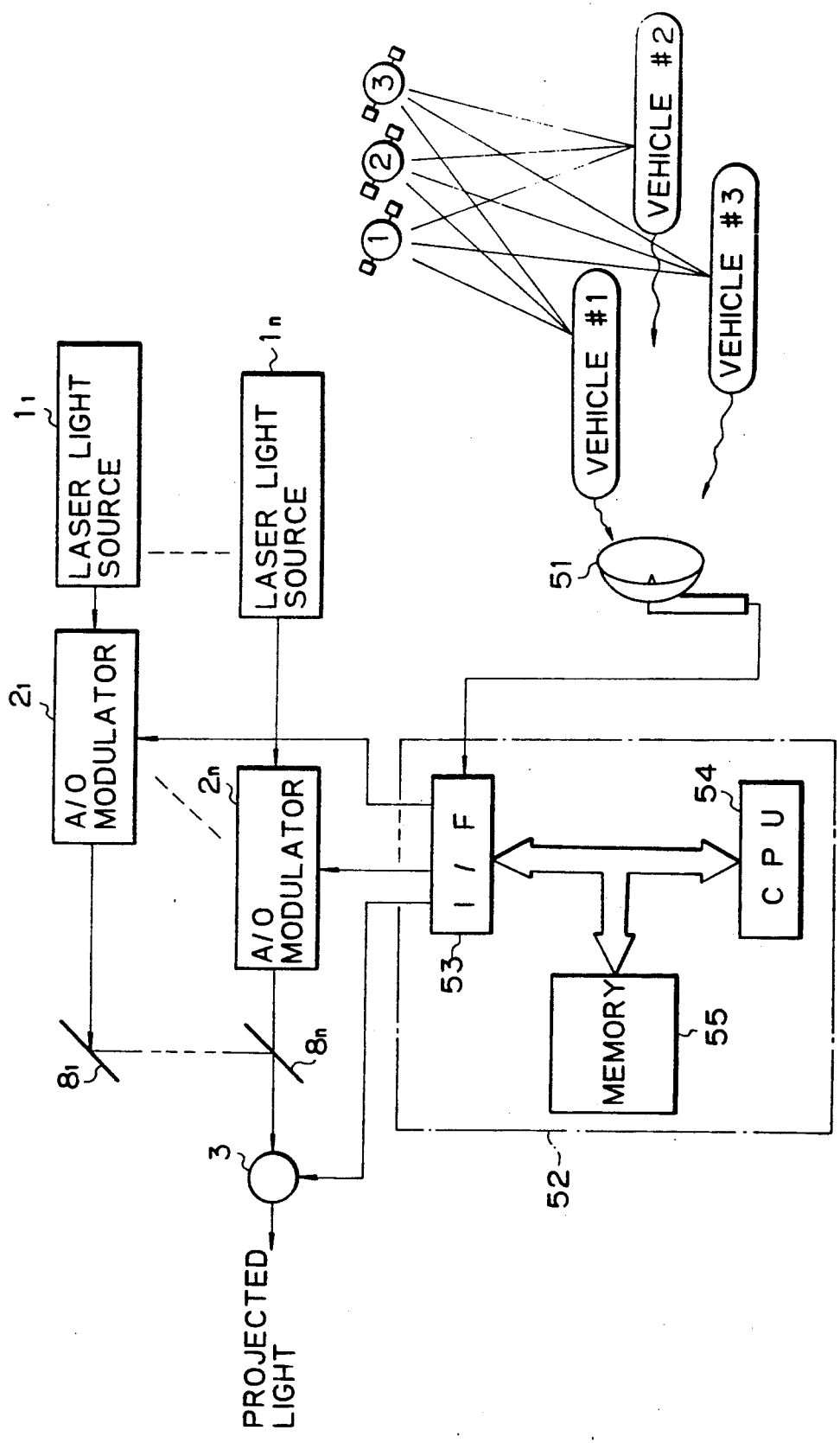

LASER PROJECTION TYPE DISPLAY UNIT

BACKGROUND OF THE INVENTION

1. Field of the invention

The present invention relates to a laser projection type display unit, and in particular to a laser projection type display unit to arbitrarily display characters and the like on screen by single stroke writing with laser beam.

2. Description of Background Information

Conventionally, the apparatus of this type has such a structure that laser beam emitted from a laser light source is deflected two-dimensionally by a galvanometer scanner, which is a two-dimensional deflection means, and is projected on screen. By controlling galvanometer scanner according to the display data by giving appropriate display data to the scanner drive, the characters and the like are arbitrarily displayed on the screen by single stroke writing.

When "12" is displayed, for example, as shown in FIG. 1 in an apparatus of conventional type, the difference in lightness is dmadebetween a→b, c→d and b→c by increasing the scanning time of b→c compared with the scanning time of a→b and c→d because laser beam is continuously projected on the screen. However, the so-called tailing phenomenon occurs between light spots because laser beam is continuously projected. Thus, it has been difficult to display a group of independent points in the case of the conventional arrangement.

SUMMARY OF THE INVENTION

Therefore, the object of the present invention is to offer a laser projection type display unit, by which it is possible to display a group of independent points.

The laser projection type display unit according to the present invention comprises a screen, a laser light source, a light modulator for cutting off or modulating the amplitude of a laser beam emitted from laser source, deflection means for deflecting laser beam coming through the light modulator in a two-dimensional manner and for projecting it on said screen, and driving means for driving said deflection means according to a display information signal.

In the laser projection type display unit of this invention, a light modulator is provided between laser light source and the two-dimensional deflection means, and laser beam is cut off or its amplitude is modulated by this light modulator.

BRIEF DESCRIPTION OF THE DRAWINGS

FIGS. 3A through 3C show the structure and arrangement of a galvano-mirror for x-axis and y-axis in a vector scanner;

FIG. 6A and FIG. 6B give examples of the shapes of light spots, group of light spots and additional information display;

FIG. 7 is a diagram of an example of this invention applied to a navigation system.

DETAILED DESCRIPTION OF PREFERRED EMBODIMENTS

In the following, the embodiments of the present invention are described in detail in connection with the drawings.

Figure 2:
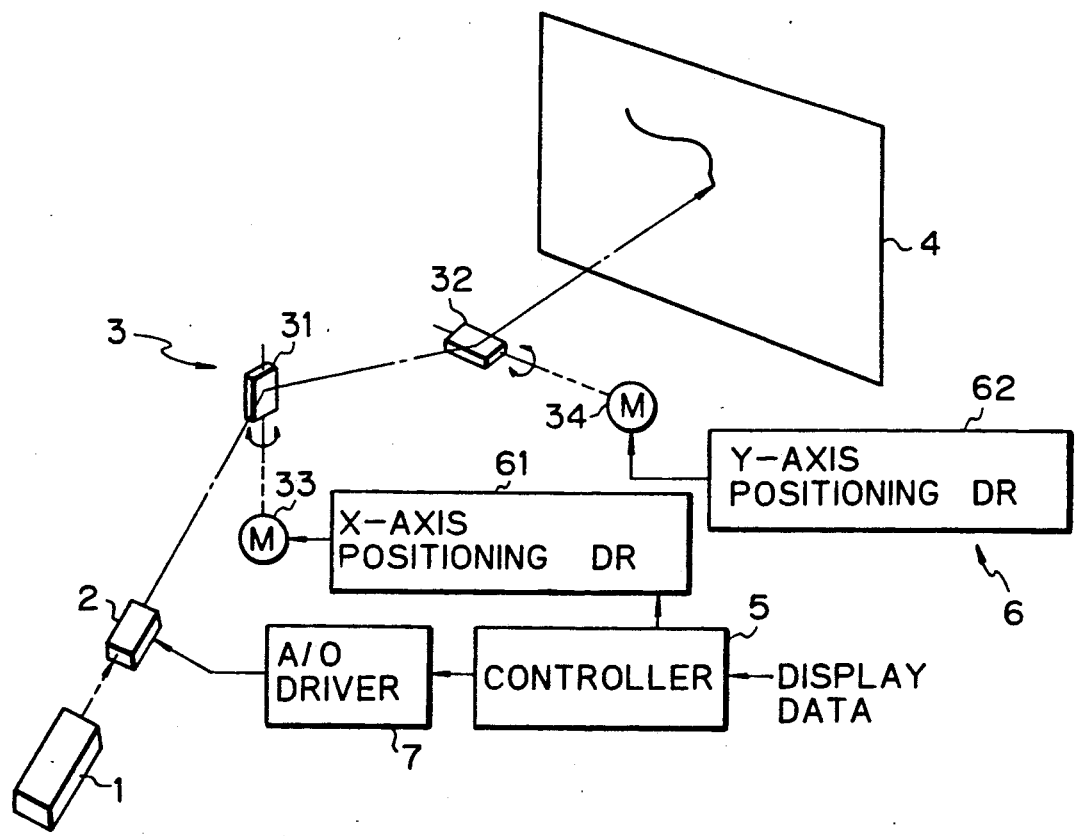
FIG. 2 is a diagram showing an embodiment of this invention.

In FIG. 2, a laser beam emitted from laser light source 1 such as He-Ne laser enters a light modulator, e.g. an A/O (acousto-optic) modulator 2. Instead of the A/O modulator 2, an E/O (electro-optical) modulator may be used. After passing through the A/O modulator 2, the laser beam is deflected two-dimensionally by a galvanometer scanner 3 provided as a two-dimensional deflection means, and is projected on a screen 4. As clearly shown in FIGS. 3A through 3C, the galvanometer scanner 3 consists of a pair of galvano-mirrors 31 and 32 for x-axis (horizontal scanning direction) and y-axis (vertical scanning direction), having two axes perpendicular to each other as the center of oscillation, and of a pair of servo motors 33 and 34 for angle control of these mirrors 31 and 32. By this galvanometer scanner 3, the laser beam projected on the screen 4 moves across the screen surface just as in the single stroke writing through the action of a pair of galvano-mirrors 31 and 32, thus displaying images such as characters.

Figure 1:
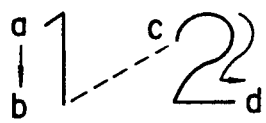
FIG. 1 shows an example of a locus followed by a laser beam.

Display data for displaying the images such as characters are input to a controller 5. The controllers 5 converts the display data to the data of x and y coordinates and supplies them to the scanner driver 6 as the sequential position data according to the sequence, which laser beam should follow, by the procedure similar to single stroke writing. During the period not requiring laser beam for image display (e.g. the period b (c in FIG. 1), control signal to cut off laser beam is supplied to A/O driver 7 by A/O modulator 2. The scanner driver 6 consists of drivers 61 and 62 for x-axis and y-axis positioning, which uses the position data from the controller 5 as a control signal, receives angle information from the servo motors 33 and 34 for x-axis and y-axis, and controls the angles.

By providing an A/O modulator 2 between laser light source 1 and the galvanometer scanner 3 and by cutting off laser beam during the period not requiring laser beam for the display of the images such as characters by this A/O modulator 2, it is possible to display a group of independent light spots in a time sharing manner by using a single laser beam. Also, not only by intermittently turn on laser beam by A/O modulator 2 but also by modulating the amplitude, diversified expression of the image can be achieved.

Figure 4:
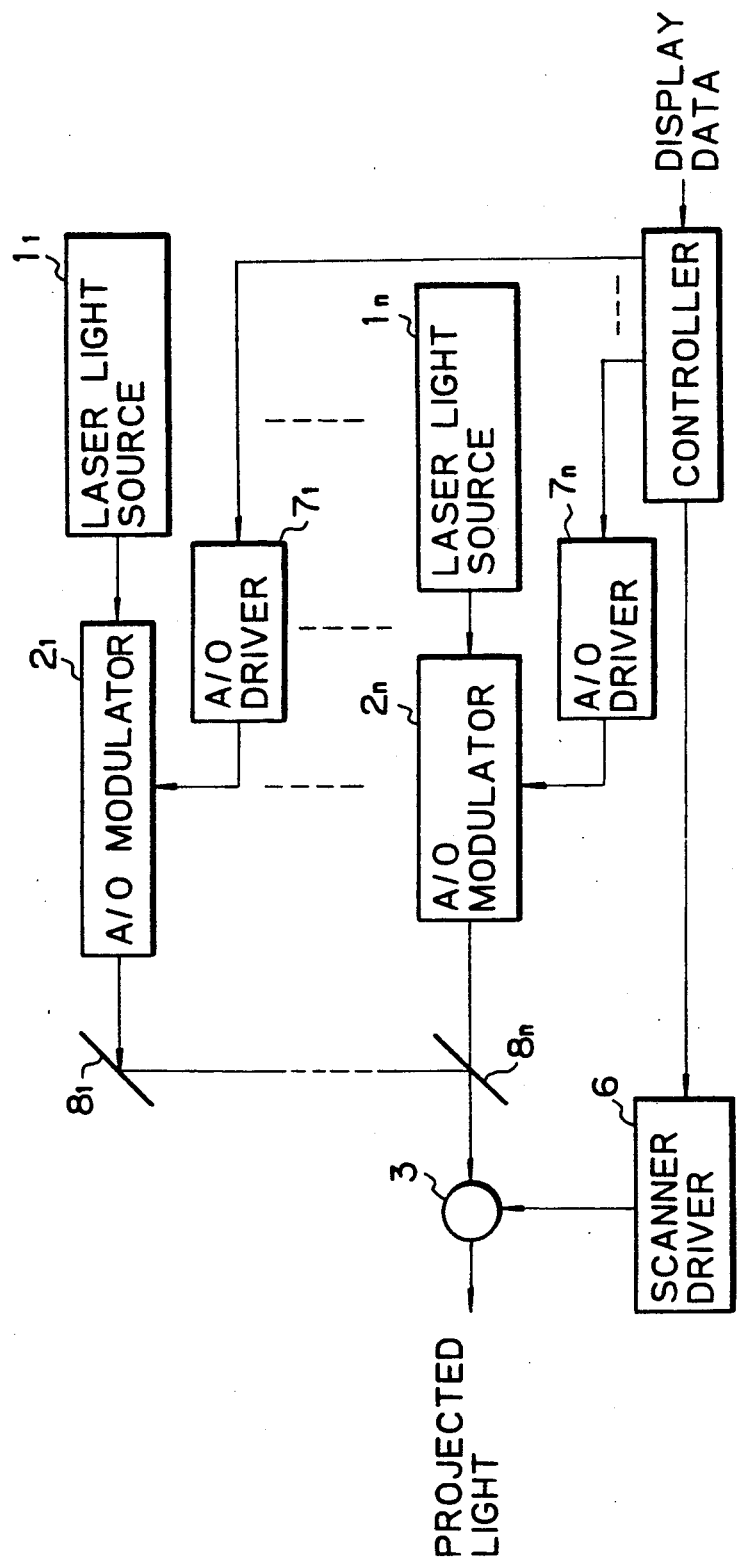
FIG. 4 is a diagram of another embodiment of the invention.

As shown in FIG. 4, the color of light spots can be freely changed by providing a plurality of laser light sources $1_1-1_n$, by modulating each laser beam individually through A/O modulators disposed for each light source, and by synthesizing the light through half mirrors $8_1-8_n$ ($8$ may be an ordinary mirror.) and by guiding it to the galvanometer scanner 3. Further, it is possible to display additional information (e.g. the number of identification) of group of light spots together in addition to the group of light spots.

Figure 5:
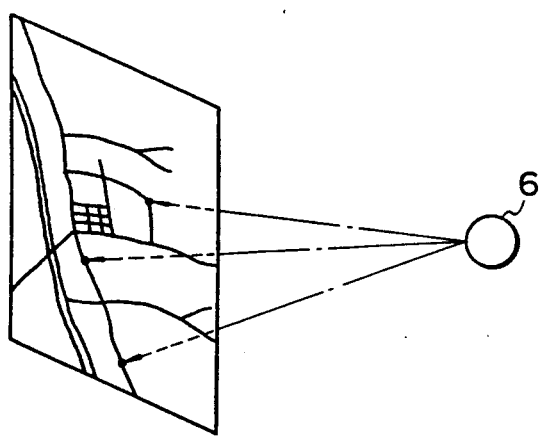
FIG. 5 shows an arrangement of a map screen.

Next, description is given on an application example of the laser projection type display unit of this invention. In this example, the invention is applied to a so-called navigation system, which displays the present position of a moving object such as vehicle on map screen as given in FIG. 5. The following map screen may be used: (1) Map directly printed on a screen or a printed map attached on a screen made of white plate, frosted glass, white cloth, etc. (2) Map slide projected on screen or map projected by laser projection apparatus. FIG. 6A shows various shapes of group of light spots, and FIG. 6B gives an example of a group of light spots and the display of its additional information.

In FIG. 7, each of a plurality of moving objects, e.g. vehicles, #1-#n is provided with a GPS (global position system) receiver (not shown), which receives electric waves from 3 satellites 1-3 and outputs the position data to indicate the absolute present position of the vehicle. The position data thus obtained are sent together with the identification data of each vehicle. The position data and identification data sent from each of the vehicles #1-#n are received by the antenna 51 and are transmitted to the controller 52. In the controller 52, the position data and the identification data transmitted are stored in the memory 55 through I/F circuit 53 under the control of CPU 54. CPU 54 converts the position data to the coordinates data for each vehicle, re-arranges data, and generates control signal of A/O modulators $2_1$-$2_n$ and galvanometer scanner 3. Then, the data are supplied to A/O modulators $2_1$-$2_n$ and to galvanometer scanner 3 through I/F circuit 53.

Figure 8:
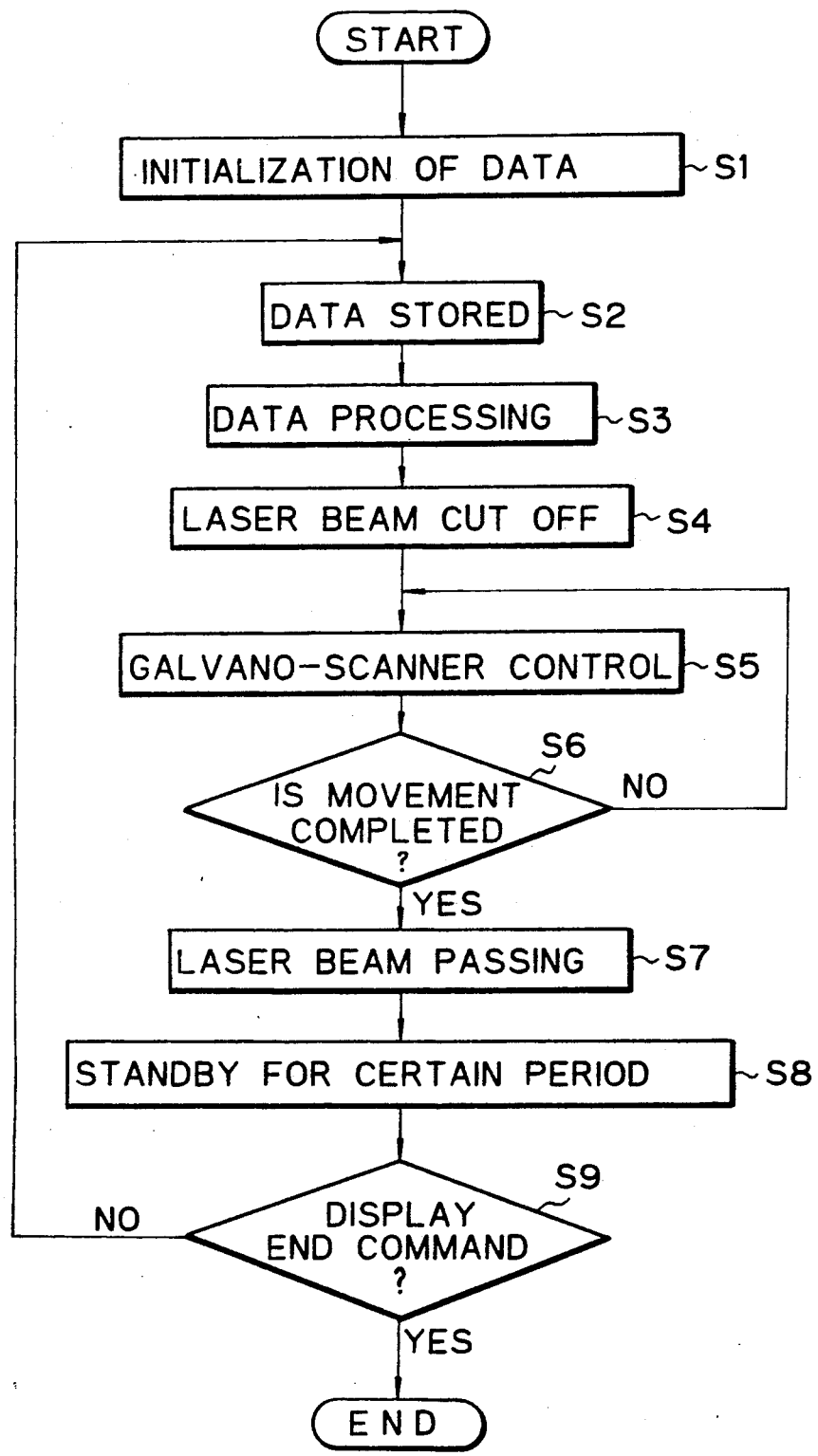
FIG. 8 is a flowchart showing the processing sequence executed by CPU when the present position of the vehicle is displayed in navigation system.

Now, description is given on the processing sequence executed by CPU 54 when the present position of the vehicle is displayed on such navigation system according to the flowchart of FIG. 8.

First, CPU 54 initializes data (Step S1) and stores the data from each of the vehicles #1-#n into the memory 55 (Step S2). Then, the data are processed by coordinate transformation or re-arrangement of data (Step S3). Next, A/O modulators 2 are controlled to cut off laser beam (Step S4), and the galvanometer scanner 3 is scanned two-dimensionally according to the coordinate data (Step S5) and judges whether the movement of galvanometer scanner has been completed or not (Step S6). When the movement is completed, A/O modulators 2 are controlled to pass laser beam (Step S7) and then stand by for a certain period of time (Step S8). Returning to the Step S2 above, the above processing is repeated until display end command is issued (Step S9).

As explained above, the laser beam is cut off or the amplitude of the laser beam is modulated by the light modulator provided between laser light source and two-dimensional deflection means in the laser projection type display unit of this invention. With this structure, it is possible to display an image made up of a group independent points.

What is claimed is:

1. A laser projection type display unit, comprising:
    a screen;
    a laser light source; and
    means for selectively producing light spots on said screen, said means for selectively producing light spots includes a light modulator for cutting off a laser beam emitted from said laser light source, deflection means for two-dimensionally deflecting the laser beam passed through said light modulator and for projecting it on said screen, and driving means for driving said deflection means according to a display information signal.

2. A laser projection type display unit according to claim 1, wherein said deflection means comprises a pair of galvano-mirrors which have two axes perpendicular to each other as the center of oscillation.

3. A laser projection type display unit as in claim 1 wherein said laser light source comprises a plurality of lasers.

4. A laser projection type display unit as in claim 3 wherein said means for producing light spots includes a light modulator for each laser.

5. A laser projection type display unit as in claim 3 wherein said means for producing light spots comprises only one deflection means.

6. A laser projection type display unit as in claim 1 wherein said light modulator is adapted to modulate amplitude of the laser beam to produce diversified expression.

7. A laser projection type display unit as in claim 1 wherein said light modulator is adapted to modulate the amplitude of the laser beam emitted from said laser light source.

8. A method of displaying a group of independent points on a screen, the method comprising steps of:
    projecting a laser beam from a laser light source to a deflection means for two-dimensionally deflecting the laser beam onto the screen;
    moving portions of the deflection means according to a display information signal to vary the location of the laser beam on the screen; and
    selectively interrupting the laser beam at a light modulator located between the laser light source and the deflection means to produce light spots on the screen, the step of selectively interrupting the laser beam including selectively cutting off the laser beam at the light modulator.

* * * * *